United States Patent
Engelko et al.

(10) Patent No.: US 10,303,665 B2
(45) Date of Patent: May 28, 2019

(54) ZERO DOWNTIME MAINTENANCE FOR APPLICATIONS AND DATABASES

(71) Applicants: Andrey Engelko, Bad Schoenborn (DE); Volker Driesen, Heidelberg (DE)

(72) Inventors: Andrey Engelko, Bad Schoenborn (DE); Volker Driesen, Heidelberg (DE)

(73) Assignee: SAP SE, Walldorf (DE)

(*) Notice: Subject to any disclaimer, the term of this patent is extended or adjusted under 35 U.S.C. 154(b) by 433 days.

(21) Appl. No.: 14/495,056

(22) Filed: Sep. 24, 2014

(65) Prior Publication Data

US 2016/0085777 A1    Mar. 24, 2016

(51) Int. Cl.
*G06F 16/21*     (2019.01)

(52) U.S. Cl.
CPC .................. *G06F 16/211* (2019.01)

(58) Field of Classification Search
CPC .......... G06F 17/30292; G06F 16/211
See application file for complete search history.

(56) References Cited

U.S. PATENT DOCUMENTS

| | | | |
|---|---|---|---|
| 7,523,142 B2 | 4/2009 | Driesen et al. | |
| 7,617,498 B1 * | 11/2009 | Lumsden | G06F 9/52 707/999.1 |
| 8,200,634 B2 * | 6/2012 | Driesen | G06F 8/65 707/610 |
| 8,250,135 B2 | 8/2012 | Driesen et al. | |
| 8,291,038 B2 | 10/2012 | Driesen et al. | |
| 8,301,610 B2 | 10/2012 | Driesen et al. | |
| 8,356,010 B2 | 1/2013 | Driesen | |
| 8,380,667 B2 * | 2/2013 | Driesen | G06F 17/30297 707/610 |
| 8,392,573 B2 | 3/2013 | Lehr et al. | |
| 8,402,086 B2 | 3/2013 | Driesen et al. | |
| 8,412,739 B2 | 4/2013 | Engelko et al. | |
| 8,434,060 B2 | 4/2013 | Driesen et al. | |
| 8,479,187 B2 | 7/2013 | Driesen et al. | |
| 8,527,471 B2 | 9/2013 | Hoprich et al. | |
| 8,560,876 B2 | 10/2013 | Driesen et al. | |
| 8,566,784 B2 | 10/2013 | Driesen et al. | |
| 8,631,406 B2 | 1/2014 | Driesen et al. | |
| 8,762,929 B2 | 6/2014 | Driesen | |
| 8,793,230 B2 | 7/2014 | Engelko et al. | |
| 8,805,986 B2 | 8/2014 | Driesen et al. | |

(Continued)

*Primary Examiner* — Mark D Featherstone
*Assistant Examiner* — Faezeh Forouharnejad
(74) *Attorney, Agent, or Firm* — Fish & Richardson P.C.

(57) ABSTRACT

Methods, systems, and computer-readable storage media for minimizing downtime during maintenance procedures to an application. In some implementations, actions include executing a first application, executing a second application, and providing an access schema layer that facilitates communication between applications and a data schema layer, the data schema layer including one or more tables of a database, wherein, during a maintenance procedure, the access schema layer includes: a first access schema, the first access schema facilitating exclusive communication between the first application and at least one table of the data schema layer, and a second access schema, the second access schema facilitating exclusive communication between the second application and one or more tables of the data schema layer.

20 Claims, 10 Drawing Sheets

(56) References Cited

U.S. PATENT DOCUMENTS

| | | | |
|---|---|---|---|
| 8,996,482 B1* | 3/2015 | Singh | G06F 17/30575 |
| | | | 707/698 |
| 2001/0044834 A1* | 11/2001 | Bradshaw | G06F 17/3089 |
| | | | 709/217 |
| 2007/0033586 A1* | 2/2007 | Hirsave | G06F 21/51 |
| | | | 717/174 |
| 2008/0098046 A1* | 4/2008 | Alpern | G06F 17/30306 |
| 2009/0307277 A1* | 12/2009 | Grubov | G06F 11/1451 |
| 2010/0153341 A1 | 6/2010 | Driesen et al. | |
| 2011/0035744 A1* | 2/2011 | Bhatia | G06F 17/30893 |
| | | | 717/174 |
| 2012/0030184 A1 | 2/2012 | Driesen et al. | |
| 2012/0036165 A1 | 2/2012 | Driesen et al. | |
| 2012/0036166 A1* | 2/2012 | Qiu | G06F 17/30297 |
| | | | 707/803 |
| 2013/0080617 A1 | 3/2013 | Driesen et al. | |
| 2013/0290259 A1 | 10/2013 | Hoprich et al. | |
| 2014/0067789 A1* | 3/2014 | Ahmed | G06F 17/30466 |
| | | | 707/714 |
| 2014/0101099 A1 | 4/2014 | Driesen et al. | |
| 2014/0164572 A1 | 6/2014 | Lehr et al. | |
| 2015/0363434 A1* | 12/2015 | Cerasaro | G06F 17/30377 |
| | | | 707/616 |

* cited by examiner

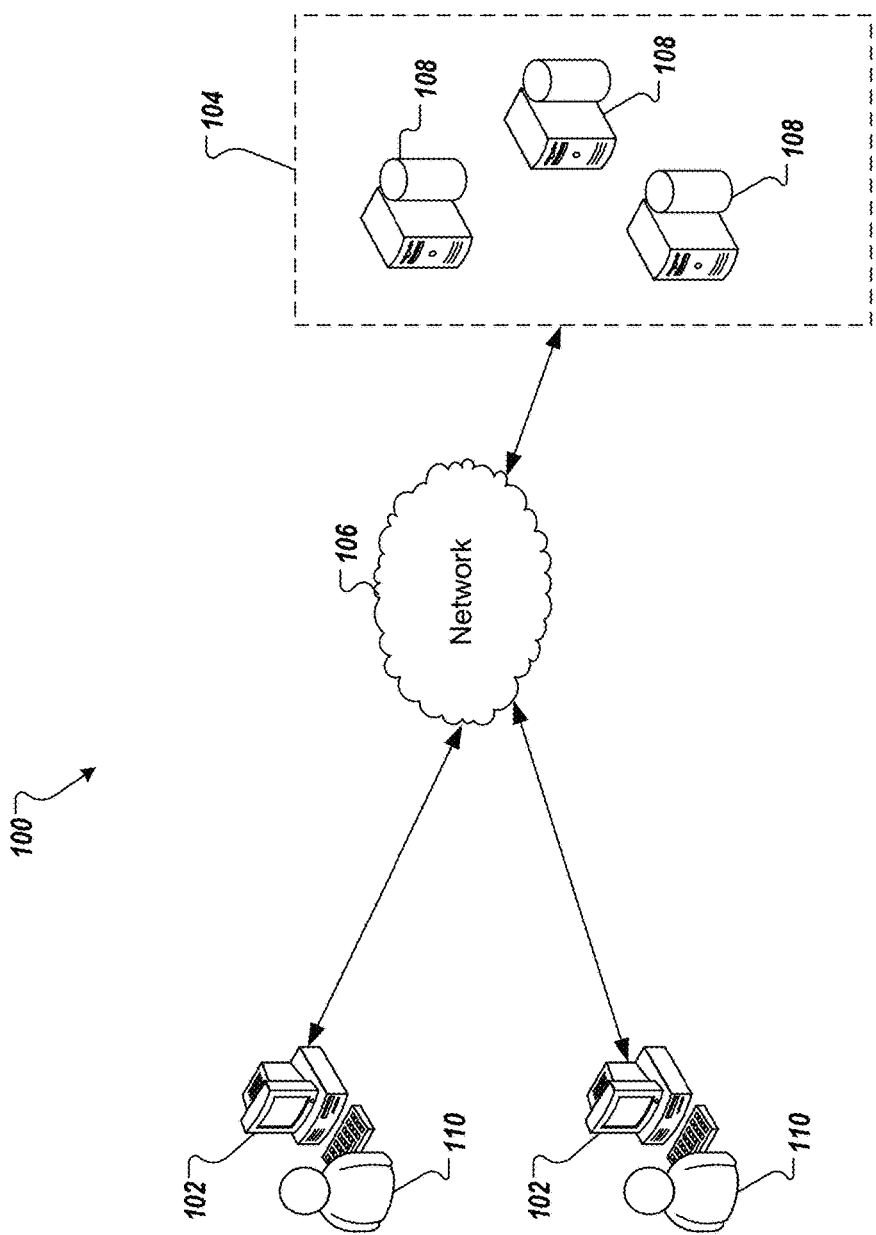

ZERO DOWNTIME MAINTENANCE FOR APPLICATIONS AND DATABASES

BACKGROUND

Entities, such as software developers and/or vendors, provide software and services. Example software can include enterprise software. In some examples, enterprise software can include application software (an application) that interacts with one or more databases. For example, an application can be hosted on one or more application servers and a user can interact with the application using a client device. In some examples, user interaction can result in data being read from, written to, and/or modified within one or more databases.

During a lifecycle of the application and/or database, one or more maintenance operations may be required. Example maintenance operations include upgrading, patching and testing. In order to perform such maintenance procedures, the application and/or database may be taken offline, such that users are unable to interact with the application and/or database, which is referred to as downtime. Although software providers have strived minimize downtime, achieving zero downtime during such maintenance procedures has been an elusive goal. Further, some maintenance procedures have required, for example, copying of data to separate databases, which can require additional resources, e.g., computer processing, memory.

SUMMARY

Implementations of the present disclosure include computer-implemented methods for minimizing downtime maintenance for application systems. In some implementations, actions include executing a first application, executing a second application, and providing an access schema layer that facilitates communication between applications and a data schema layer, the data schema layer including one or more tables of a database, wherein, during a maintenance procedure, the access schema layer includes: a first access schema, the first access schema facilitating exclusive communication between the first application and at least one table of the data schema layer, and a second access schema, the second access schema facilitating exclusive communication between the second application and one or more tables of the data schema layer. Other implementations of this aspect include corresponding systems, apparatus, and computer programs, configured to perform the actions of the methods, encoded on computer storage devices.

These and other implementations can each optionally include one or more of the following features: the first access schema includes one or more views, each view including a projection view to the at least one table that defines one or more fields of the at least one table, from which data is to be selected in response to a query from the first application; the second access schema includes at least one view that joins data retrieved from multiple tables, and provides the data to the second application; the multiple tables include the at least one table and a delta table, the delta table storing test data that is provided during execution of the first application as a production application and the second application as a test application; the access schema layer further includes a trigger that, in response to a write request from the second application, writes data to a table of the multiple tables; the multiple tables include a customer table that stores customer data, and an application table that stores application data that is specific to the second application; the second application is a new version of the first application, and the maintenance procedure includes an upgrade procedure; actions further include copying, by a database trigger, data from a first table to a second table, wherein, during the maintenance procedure, the first access schema accesses the first table and the second access schema access schema accesses the second table.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 1 depicts an example high-level architecture in accordance with implementations of the present disclosure.

Like reference symbols in the various drawings indicate like elements.

DETAILED DESCRIPTION

Figure 2A:
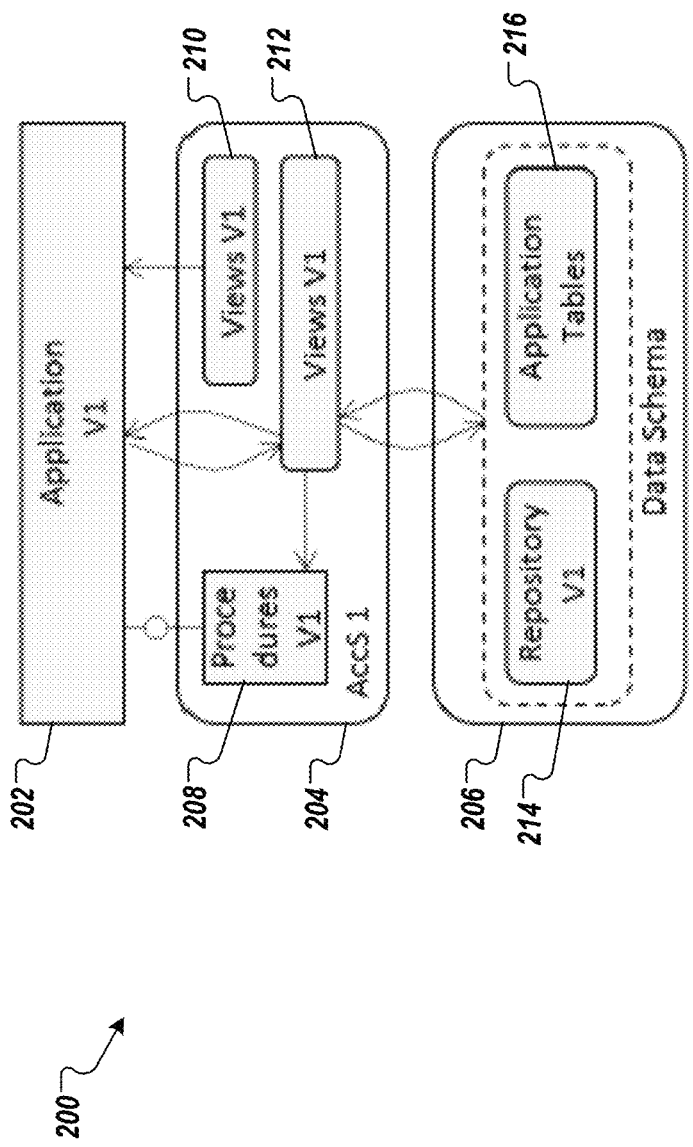
FIGS. 2A-2C depict example.

Implementations of the present disclosure are generally directed to minimizing downtime during maintenance operations for applications and/or databases. In some implementations, zero downtime is achieved to provide continuous availability of application and/or databases during one or more maintenance procedures. In some implementations, an access schema layer is provided between an application layer and a data schema layer, the access schema layer including one or more access schemas, through which respective applications of the application layer communicate with one or more tables of the data schema layer. In some examples, each application exclusively communicates with the data schema layer through a respective access schema. Implementations of the present disclosure provide a simplified upgrade procedure, as compared to traditional techniques, as well as providing a zero downtime patch procedure. Further, implementations of the present disclosure provide a test environment on target releases of application for transactions, e.g., interactions on/with stored data, which enables a test to write data to the database and discard the written data consistently after the test has been completed.

FIG. 1 depicts an example architecture 100 in accordance with implementations of the present disclosure. In the depicted example, the example architecture 100 includes one or more client devices 102, a server system 104 and a network 106. The server system 104 includes one or more server devices 108. In the depicted example, respective users 110 interact with the client devices 102. In an example context, a user 108 can include a user, who interacts with an application that is hosted by the server system 104. In another example context, a user 110 can include a user, who interacts with the server system 104 to perform one or more maintenance procedures, described in further detail herein.

In some examples, the client devices 102 can communicate with one or more of the server devices 108 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each server device 108 includes at least one server and at least one data store. In the example of FIG. 1, the server devices 108 are intended to represent various forms of servers including, but not limited to a web server, an application server, a proxy server, a network server, and/or a server pool. In general, server systems accept requests for application services and provides such services to any number of client devices, e.g., the client devices 102, over the network 106.

In some implementations, one or more data stores of the server system 104 store one or more databases. In some examples, a database can be provided as an in-memory database. In some examples, an in-memory database is a database management system that uses main memory for data storage. In some examples, main memory includes random access memory (RAM) that communicates with one or more processors, e.g., central processing units (CPUs), over a memory bus. An-memory database can be contrasted with database management systems that employ a disk storage mechanism. In some examples, in-memory databases are faster than disk storage databases, because internal optimization algorithms can be simpler and execute fewer CPU instructions, e.g., require reduced CPU consumption. In some examples, accessing data in an in-memory database eliminates seek time when querying the data, which provides faster and more predictable performance than disk-storage databases.

Implementations of the present disclosure are described in further detail herein with reference to an example context. The example context includes business applications that are executed on a client-server architecture, such as the example architecture 100 of FIG. 1. In some examples, business applications can be provided in a business suite that includes two or more business applications. Example business applications can include an enterprise resource planning (ERP) application, a customer relationship management (CRM) application, a supply chain management (SCM) application, and a product lifecycle management (PLM) application. It is contemplate, however, that implementations of the present disclosure can be realized in any appropriate context, e.g., healthcare applications.

Referring again to FIG. 1, and in the example context, one or more business applications can be hosted by the server system 104. A user 110 can interact with a business application using the client device 102. More specifically, a session can be established between the client device 102 and one or more server devices 104, during which session the user 110 is able to interact with one or more business applications hosted on the server system 104. The one or more business applications can enable the user to interact with data stored in one or more databases. In some examples, interactions can result in data being stored to the database, deleted from the database, and/or edited within the database.

In some implementations, business applications and/or databases undergo lifecycle management. In some examples, lifecycle management includes executing one or more maintenance procedures for a business application and/or a database. Example maintenance procedures can include an upgrade procedure, a patch procedure, a customer configuration procedure, and development and testing procedures. An example upgrade procedure can include updating software. For example, a business application can be updated from a first version, e.g., V1, to a second version, e.g., V2. An example update can include adding functionality to the business application. As another example, a database can be updated from a first version, e.g., V1, to a second version, e.g., V2. An example update can be updating a data schema of the database. In some examples, a data schema (also referred to as database schema) is a data structure that defines how data is to be stored in the database. In some examples, the databases schema can be defined in a formal language that is supported by a database management system (DBMS), and can include a set of formulas (also referred to as constraints) imposed on the database. In general, a data schema can be described as a catalog that specifies all database objects that can be stored in the database. In some examples, different data schemas, e.g., V1 versus V2, can have different objects with the same object name, but different structures.

As introduced above, the execution of maintenance procedures traditionally results in downtime, e.g., unavailability, of an application and/or database. Implementations of the present disclosure enable zero downtime of the application and/or database during maintenance procedures. That is, implementations of the present disclosure provide continuous availability of an application and/or data during one or more maintenance procedures. Implementations of the present disclosure are based on changes to persistency management during maintenance procedures. More particularly, and as described in further detail herein, implementations of the present disclosure provide an abstraction layer made up of one or more access schemas, which access schemas can be used by lifecycle management (and other infrastructures) to separate the concerns of the application and the lifecycle management tools. In some examples, a persistency structure (data schema) can be altered to accommodate the lifecycle management tools, wherein the access layer provides the required structures and content to the applications consuming persistency (stored data) through the respective access layer.

In further detail, implementations of the present disclosure provide an abstraction layer, e.g., including the access schemas, between the database and the application, which abstraction layer can be controlled by lifecycle management tools. In general, and as described in further detail herein, access (application) is separated from the persistency (database) by an access schema, which can be used for several purposes in addition to lifecycle management described herein. In some examples, an application (and corresponding application server) only interact with the data schema through a respective access schema. As introduced above, the data schema of the database contains the database tables. In some implementations, the application accesses the database (the data schema) through the access schema, while lifecycle management tools and/or data dictionary tools directly access the data schema. In some implementations, the access schema contains a proxy view for every database table in the data schema, and provides access to the database tables.

In some examples, a proxy view can be described as an updatable projection view into a database table. In some examples, and as described in further detail herein, the access schema contains views defined on top of proxy views. Example views can include attribute views, calculation views and analytical views. As an example, a proxy view can define data that is to be retrieved from a table. For example, a table "T1" can include fields F1-F5, and a proxy view "Table" can be provided, which provides that data from fields F1-F4 are to be selected in response to a query. Consequently, for example, the application can issue a query, the query is processed by the proxy view "Table," which retrieves data from fields F1-F4 of the table "T1" (even though the table "T1" also includes a field F5), and provides the data to the application. In this manner, a proxy view can mask certain portions of the table, and/or can mask other tables from the application. In some examples, an update to the table will write the database default to the masked field F5. If no suitable database default is available, an application defined value can be written using a database trigger.

In some implementations, multiple access schemas can be provided for the same data schema. For example, a first access schema can enable communication between a first application and the data schema, and a second access schema can enable communication between a second application and the data schema. In some examples, and as described in further detail herein, multiple access schemas can be used to support an upgrade procedure. More particularly, and as described in further detail below, target database structures, e.g., in a new format, can be created, e.g., during upgrading the database from a first version to a second version, while an application still accesses the data in the old format using the first access schema. An upgrade tool can be used to provide a target access schema, e.g., the second access schema, and deploys the new software. A test instance can access the data through the second access schema, while the data is still able to be access through the first access schema. After the upgrade is completed, the second access schema is used to access the data, and the first access schema can be deleted.

In some implementations, an access schema can include a so-called "instead-of" trigger, which enables data to be written to complex views. In some examples, an instead-of trigger includes one or more write statements to respective database tables. For read-access, a view is used to join data from potentially several database tables. In response to a write attempt to the view, the instead-of trigger is called, and the write statements of the instead-of trigger are used to write data to respective database tables. Accordingly, instead-of triggers provide further abstraction between persistency (the data schema) and application.

Figure 2B:
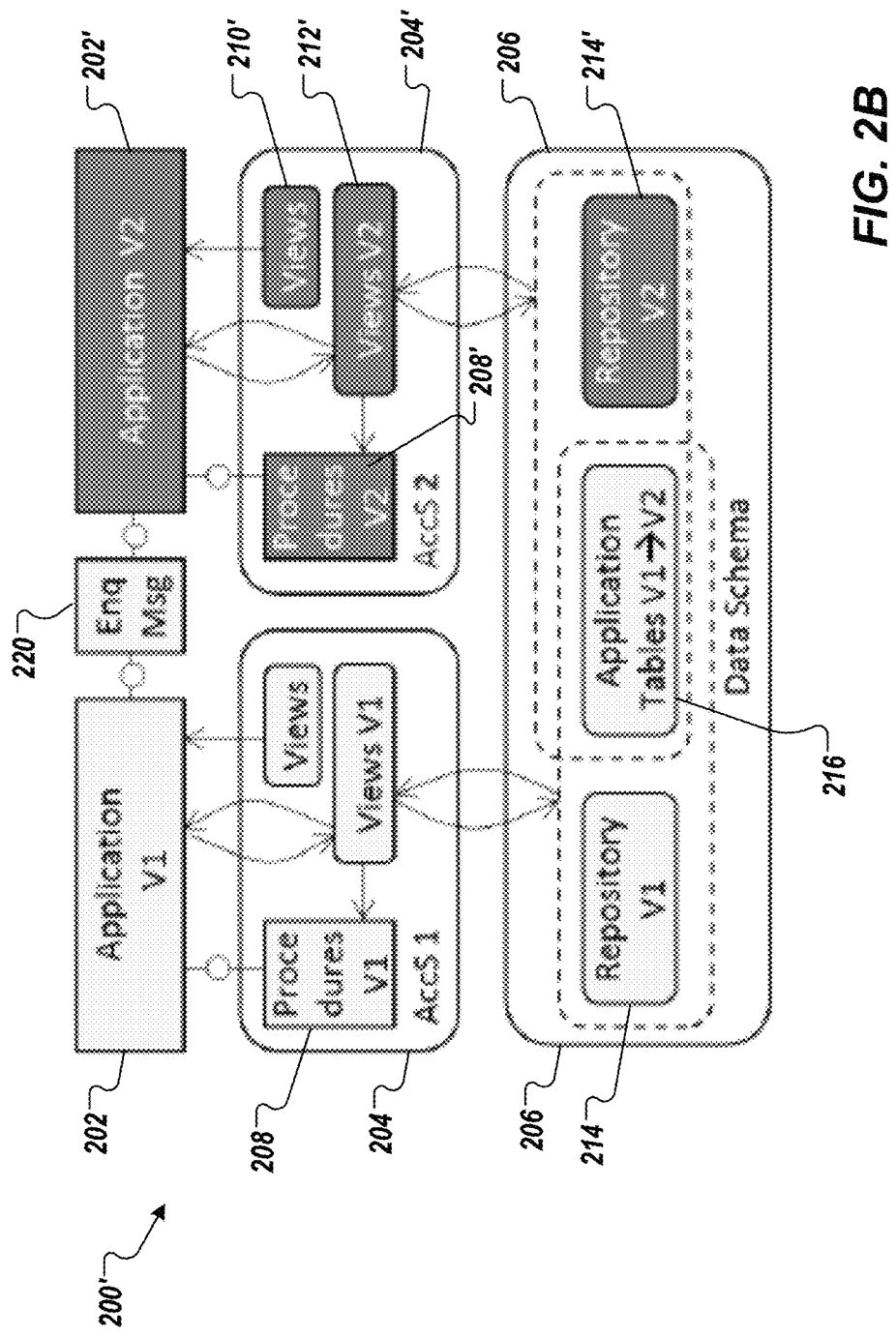
Figure 2C:
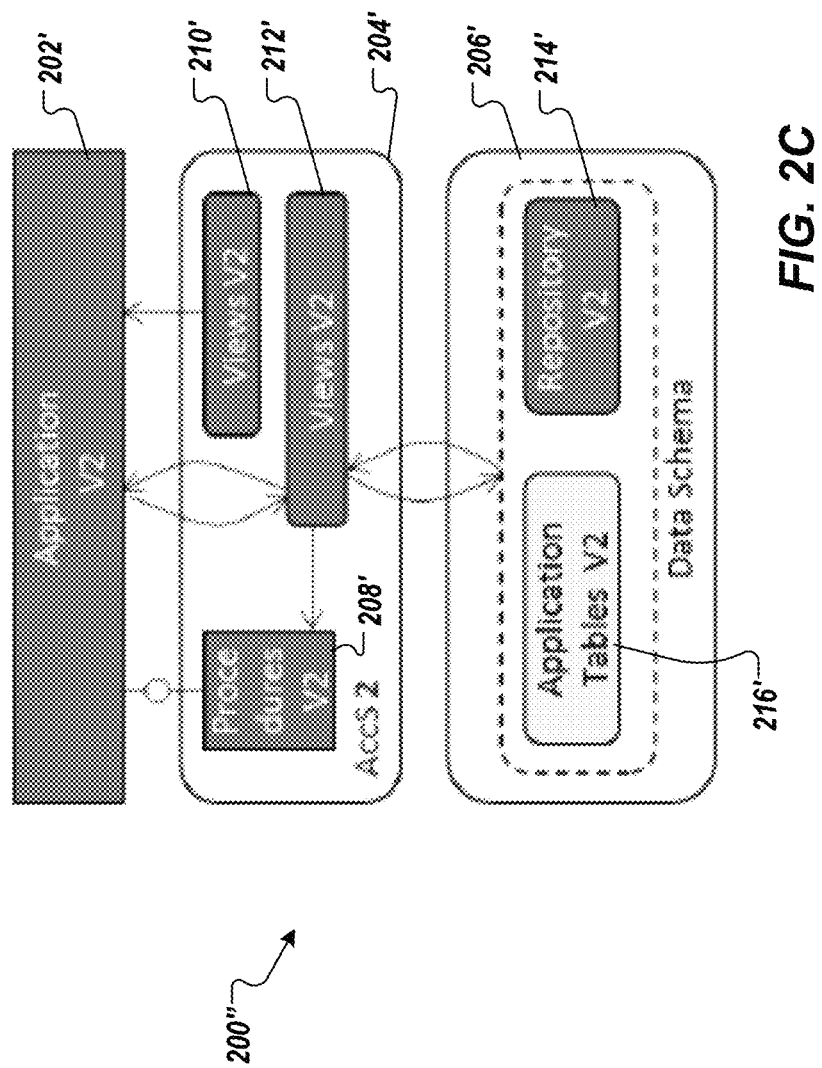

FIGS. 2A-2C depict an example maintenance procedure in accordance with implementations of the present disclosure. With particular reference to FIG. 2A, a pre-maintenance (pre-upgrade) environment 200 is depicted and includes an application 202, an access schema 204 and a data schema 206. In some examples, the application 202 and the access schema 204 are each provided as one or more computer-executable programs executed by a computing device, e.g., a server device. In some examples, the data schema 206 is provided as a computer-readable file, e.g., resident within a DBMS. The access schema 204 includes one or more procedures 208, one or more views 210 and one or more proxy views 212. In some examples, each of the one or more procedures 208 is provided as one or more computer-executable functions. In some examples, a procedure is provided in computer-readable/-executable code that, for example, can pass parameters and functions, e.g., from the application, can access, read and write views, and that can access other procedures. The data schema 206 includes a repository 214 and one or more application tables 216. In the depicted example, the application 202 is provided as a first version V1, the access schema is provided as a first version AccS V1, and the repository 214 is provided as a first version V1. In some examples, a repository stores one or more artifacts, e.g., executable program code; configuration data, e.g., currency settings, date/time format; and one or more tables that hold coding, e.g., hypertext markup language (HTML) pages, Javascript. In some examples, application tables store data provided by users through the application.

In some examples, and as described above, during an upgrade, the application can be upgraded from the first version V1 to a second version V2. In some examples, one or more components of the application 202 are replaced by new, or new versions of components. In accordance with implementations of the present disclosure, the complete application and configuration repository can be exchanged during the upgrade.

FIG. 2B depicts a mid-maintenance (mid-upgrade) environment 200' and includes an application 202', an access schema 204' and the data schema 206. In some examples, the application 202' and the access schema 204' are each provided as one or more computer-executable programs executed by a computing device, e.g., a server device. In some examples, the data schema 206 is provided as a computer-readable file, e.g., resident within a DBMS. The access schema 204' includes one or more procedures 208', one or more views 210' and one or more proxy views 212'. The data schema 206 includes a repository 214' and one or more application tables 216'. In the depicted example, the application 202' is provided as a second version V1, the access schema 204' is provided as a second version AccS V2, and the repository 214' is provided as a second version V2. In some implementations, names of the access schema 204' and the repository 214' are different from the names of the access schema 204 and the repository 214 (alternative names).

During the upgrade procedure, the repository 214' is deployed using alternative names to the data schema 206. The access schema 204' is provided and includes views to the repository 214' with the alternative names and views to the application tables 216'. In some examples, changes to the application tables 216 to provide the application tables 216' can be managed with an online table conversion. The application 202' (the target application) can be started and tests can be run using test data sets (data that can be deleted after testing is performed).

During the upgrade procedure, table structures can be changed and new content (data) can be deployed. In some examples, a majority of the application tables remain unchanged, e.g., remain with the same database schema. In this manner, potentially terabytes of data is unchanged. In some examples, a minority of application tables can be changed, or replaced by new application tables. Because the access schemas provide an abstraction layer, the application only sees and knows a respective access schema. The lifecycle management tools, however, are able to alter tables, rename tables and add invisible content (data) to an existing table.

The transition of the users from the application 202 (the start application) to the application 202' (the target application) can be seamless and transparent to the users. In some examples, locks can be implemented to lock data (data objects) in the start application (or the target application), such that the target application (or the start application) cannot alter the data in parallel. With continued reference to FIG. 2B, a messaging server 220 is provided. In some examples, the messaging server is provided as an enqueue server that communicates with the applications 202, 202' (the respective applications servers executing the applications 202, 202'). In some examples, the messaging server 220 provides the locking functionality and selectively assigns exclusive access to data objects, such that one application cannot access a data object that another application has exclusive access to.

In some examples, the locks are maintained until the last user has been switched from the start application to the target application. In this manner, the start application and the target application can be accessed in parallel. In some examples, application components having incompatible changes as part of the upgrade can be set to read-only or switched off during the transition. Once the upgrade is completed, the users exclusively work with the application 202'. The name of the access schema 204' and the names of the repository 206' are not visible to the application 202' or the end user. Consequently, the names can remain as the alternative names, e.g., the names do not need to be changed back to the names of the access schema 204 and the repository 214. During a subsequent upgrade, the original names can be used again, e.g., flip-flop between names across upgrades.

After the upgrade is complete and all users have been transitioned, the application 202, the access schema 204 and the repository 214 are removed. FIG. 2C depicts a post-maintenance (post-upgrade) environment 200".

As discussed above, an example maintenance procedure includes a patch procedure. In some examples, a patch procedure includes deploying one or more patches to update an application or its supporting data, to fix or improve the application, e.g., fixing security vulnerabilities or bugs, improving the usability or performance. In some implementations, to deploy a patch, not all repository tables need to be copied. In some examples, and as similarly described above for the upgrade procedure, the patch can be tested, e.g., using discardable test data, and the system can be reverted, e.g., if the test failed. In some examples, the application server hosting the patched application does not need to be restarted after the patch procedure. As similarly described above with respect to the upgrade procedure, locks can be used during the patch procedure such that the production and patch process do not change the same data (data objects) simultaneously.

Implementations of the present disclosure enable multi-version management. More particularly, with tables holding delivered data (repositories) and/or user data (application tables), the management of data versions is a challenge for any maintenance procedure. The content (data) of the start release, e.g., application V1, must be kept consistent for the start release runtime to enable continuous use of the application during maintenance procedures. New content needs to be provided consistently to enable testing on the target release, e.g., application V2. In parallel, consistent source version content should be available as a back-out option to discard the target version and continue with the start version in case of problems.

Having an abstraction layer between the access (access schema) and the persistency (data schema), as described above, enables the introduction of a version key field and change operation field, even if they are not propagated to the application (consumer). Consequently, data having a new version can be deployed and the start release application (the application V1 in continued use by users during a maintenance procedure) is not aware of the data until the application is configured to read the new data. In this manner, tests can be executed on the newly deployed data before it is set live. In some implementations, this is achieved using a version key field for the content tables, and customizing and configuration and creating views to access data, which specify the version.

Figure 3A:
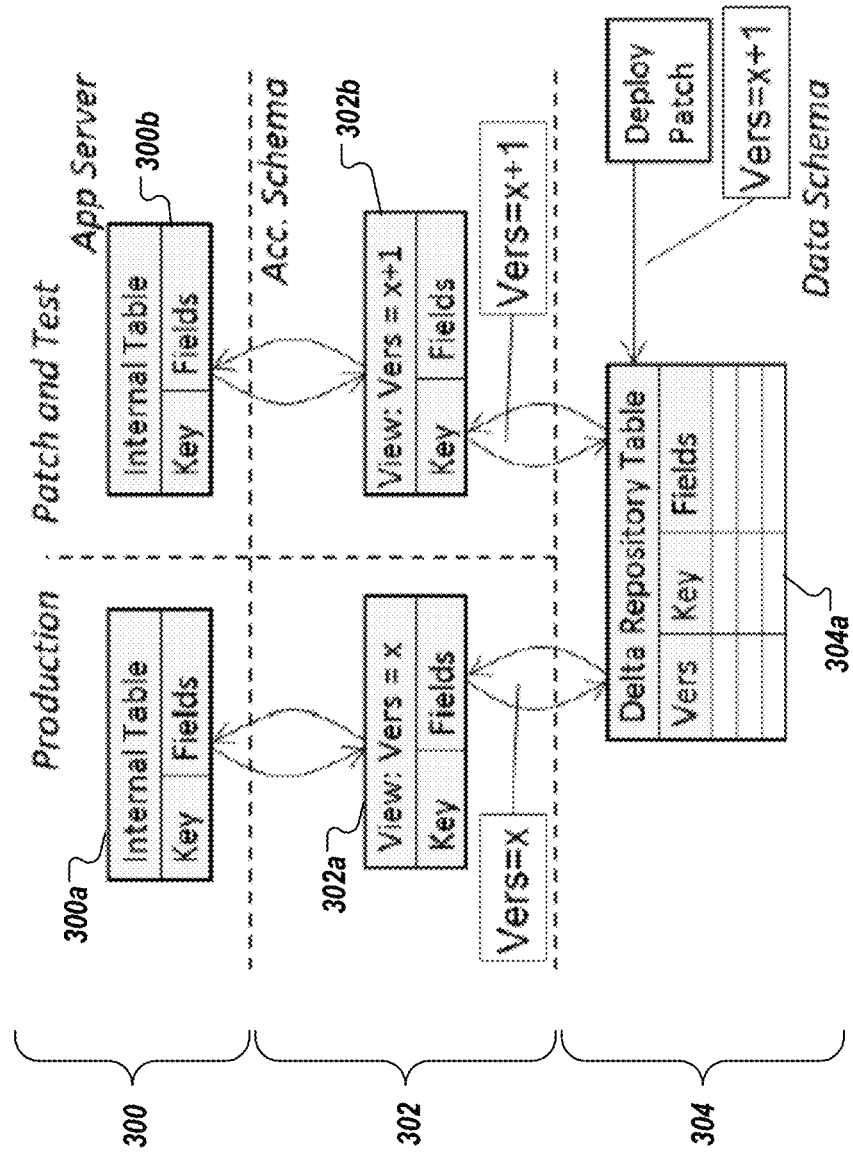
FIGS. 3A-3D depict example processes that can be executed in accordance with implementations of the present disclosure.

FIG. 3A depicts example tables and table interactions based on multi-version management in accordance with implementations of the present disclosure. The example of FIG. 3A includes an application server layer 300, an access schema layer (abstraction layer) 302, and a data schema layer 304. The application server layer includes internal tables 300a, 300b of respective applications, e.g., a production application (start release) and a patch and test application (target release). The access schema layer 302 includes proxy views 302a, 302b of respective access schemas. The data schema layer 304 includes a delta repository table 304a that includes a version key field, as described herein. The start release (production) application only accesses the data schema layer 304 through the respective access schema including the proxy view 302a, and the target release (patch and test) application only accesses the data schema layer 304 through the respective access schema including the proxy view 302b.

In contrast to traditional techniques, multi-version management provided by the present disclosure reduces the amount of resources, e.g., computing, memory, required to perform maintenance procedures. For example, traditional techniques can require cloning (copying) of data tables, and then adjusting the structure and content of the copied tables to match the target release. This can require a significant amount of additional storage capacity. Further, traditional techniques can require database triggers to merge the content from the production on the start release and content from the upgrade in the target release. This can require a significant amount of computing power, adversely impacting system performance.

Implementations of the present disclosure further provide online table structure migration. In some examples, the term "online" refers to production use of the source table, as described herein. That is, the table migration can be performed without downtime. In some instances application developers seek to change the persistency layout in an incompatible manner. In some examples, can result in table conversion or the need to use an application specific migration program, e.g., eXecute PRogram After deployment (XPRA), both of which result in downtime. In some examples, a migration has to be provided by the application developer, but execution of the migration also results in downtime. Implementations of the present disclosure provide a migration function that is capable of migrating the table during parallel productive access. In some implementations, the migration function includes creation of the target table in parallel to the source table, equipping the source table with a database trigger updating the target table together with the source table in the same transaction. In parallel, a process is run, e.g., by the trigger, which copies all data from the source table to the target table.

Figure 3B:
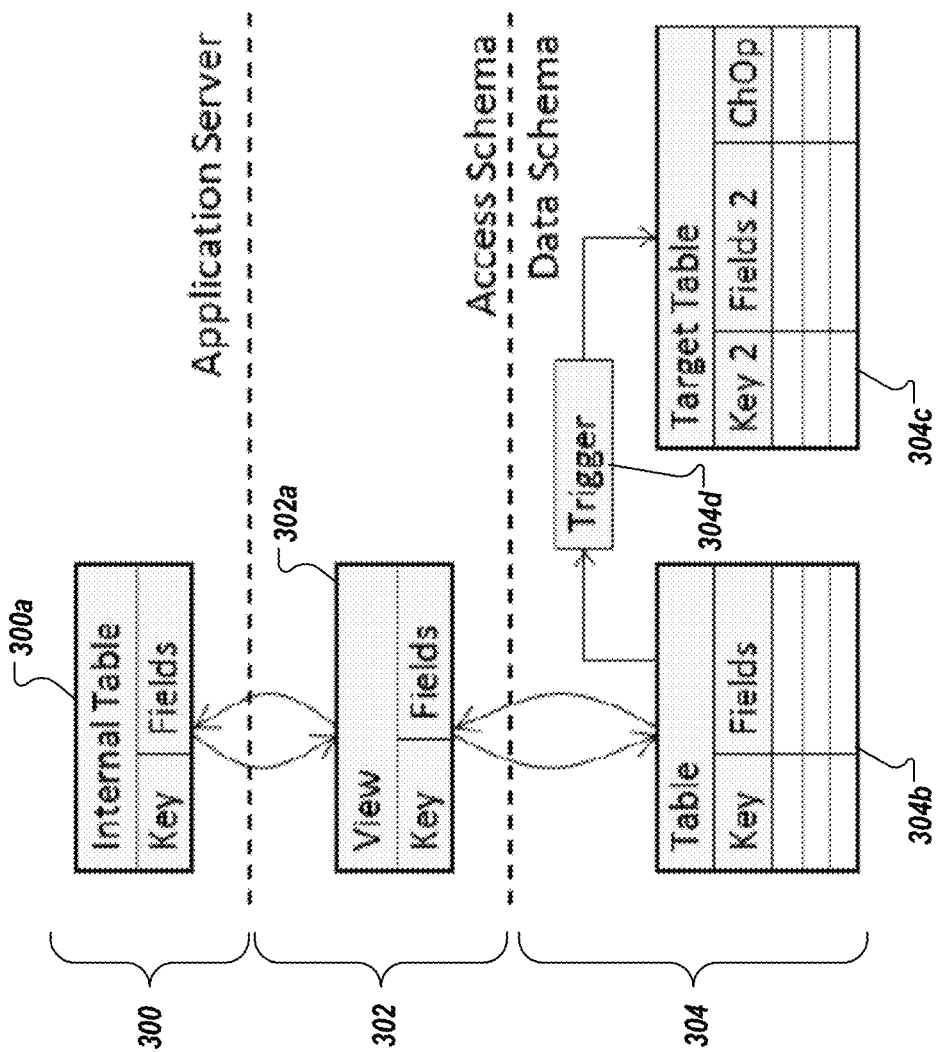

FIG. 3B depicts example tables and table interactions based on online table structure migration in accordance with implementations of the present disclosure. The example of FIG. 3B includes the application server layer 300, the access schema layer (abstraction layer) 302, and the data schema layer 304. In the example of FIG. 3B, the access schema layer includes the proxy view 302a, and the data schema layer 304 includes a source table 304b, a target table 304c and a trigger 304d.

Implementations of the present disclosure further provide a compensation view. In some examples, after the structure of a table is changed, the change can be directly visible to the applications (consumers). In some instances, this can result in errors and/or failures of an application working with the tables. Accordingly, implementations of the present disclosure enable extension of a table without completely copying the content of the table from the old structure to the new structure. In some implementations, a compensation view is created in the access schema, and can be described as an access view that includes only the fields required by the application, while the database table can have more fields. The compensation view can be used, for example, to extend a table for a new release, add fields, make field longer, while the old release still works with the old structure without disruption.

Implementations of the present disclosure further provide content separation. In some examples, content separation can be described as a variant of multi-version management, described herein. In some examples, an application is deployed to a customer with a default configuration, which is extended or modified by the customer. If both customer (user) content and application content are stored in a single table, the potential exists for collisions between application data and customer modified data. In some examples, deploying new content to a table, where customers modified the content, results in complex deployment and adjustment processes and can require downtime. One solution would be to re-design the persistency configuration. However, this cannot be done without adjusting the persistency model of the application, which can result in significantly high implementation costs relative to the benefit it would create.

Accordingly, implementations of the present disclosure provide content separation. More specifically, content seen through an access view (proxy view) must not necessarily come from one table only. In some implementations, the access view can join content of a plurality of tables. For example, the access view can join content of a customer table that includes transactional data, and an application table that includes application-specific data (configuration data). In some implementations, updates to the access view are handled by an instead-of-trigger, described above, which can write the content of the user to the customer table. In some examples, an upgrade procedure can import new content to the application table without requiring collision handling. This can increase the speed of the upgrade procedure. In some implementations, content separation can be achieved using multi-version management, even if both the customer content and the application content are written to the same table. That is, for example, the table can include a version key field, which indicates the type of respective content.

Figure 3C:
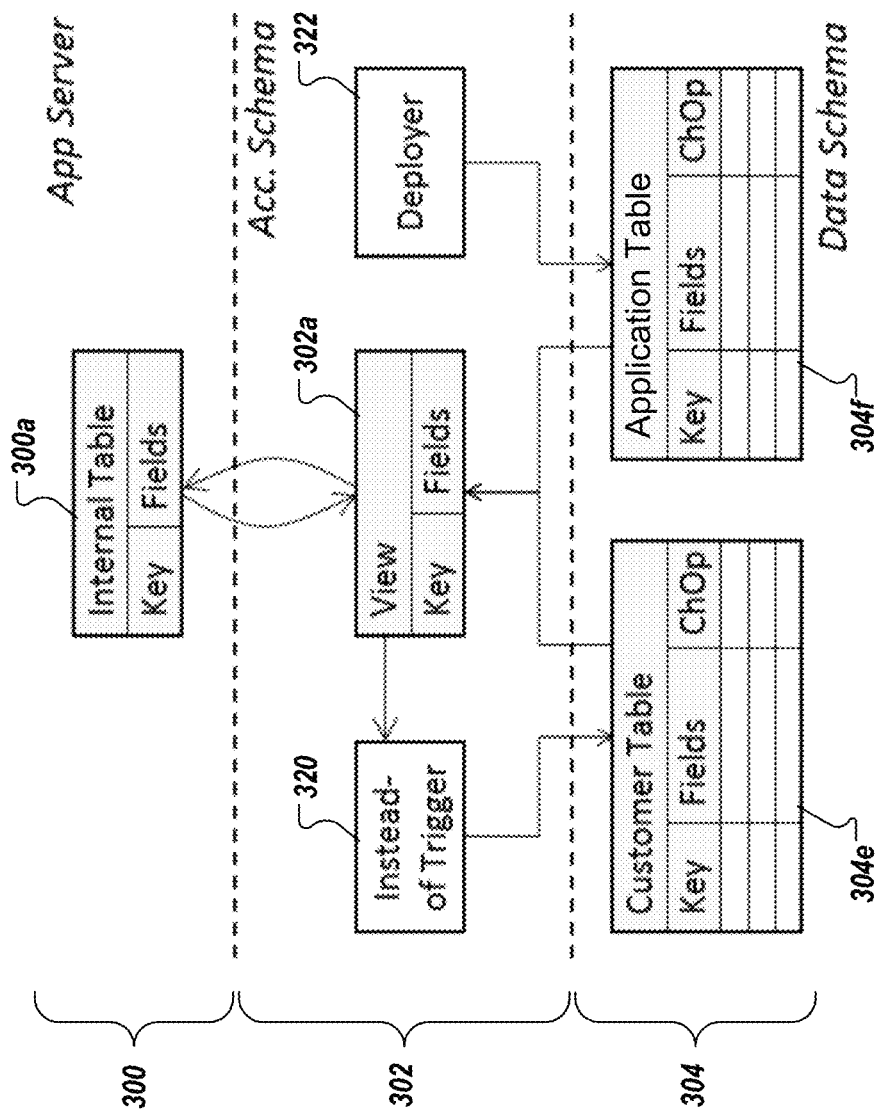

FIG. 3C depicts example tables and table interactions based on content separation in accordance with implementations of the present disclosure. The example of FIG. 3C includes the application server layer 300, the access schema layer (abstraction layer) 302, and the data schema layer 304. In the example of FIG. 3C, the access schema layer includes the proxy view 302a, and the data schema layer 304 includes a customer table 304e and an application table 304f. In some implementations, the proxy view 302a joins content (data) read from the customer table 304e and the application table 304f. In the depicted example, the access schema layer 302 includes an instead-of trigger 320 and a deployer 322. In some examples, the instead-of trigger 320 writes data to and/or edits data in the customer table 304e. In some examples, the deployer 322 writes data to and/or edits data in the application table 304f.

In contrast to traditional techniques, implementations of the present disclosure relieve the need to create a copy of the application table and deploy the content to the copy and switch the table afterwards, which can consume a significant amount of resources, e.g., time, memory, processing power. Also, implementations of the present disclosure do not require deployment of configuration data during downtime.

Implementations of the present disclosure further provide fast loading of table content. More particularly, single row insert for loading table content is a relatively slow operation, and requires a relatively high amount of downtime. It is much faster to load complete tables. In this case, indexes can be created after the load to increase the speed of the load operation. This load approach is currently only possible for new tables or for tables, which are switched after a maintenance procedure, e.g., old versions table being dropped, new versions table being renamed from imported to the active. This switch, however, also results in downtime.

Accordingly, implementations of the present disclosure provide fast loading of table content. More specifically, a new version of a table including content can be deployed under a different name, e.g. having tables of one version with the prefix "/X/" and tables of the next version with prefix "/Y/." In some examples, the new access schema can create an access view with the "real" name of the table without the "/X/" or "/Y/." In this manner, table names would no longer be required to be switched.

As described above, implementations of the present disclosure enable data sets, which can be used for testing, and can be subsequently discarded (discardable data sets). In some examples, this can be achieved as a variant of multi-version management described herein. In some instances, the question of what to do with test data has an unclear answer. For example, if test data includes production data, e.g., "real" data, the test is hard to revert. Otherwise, dummy data is required as test data, which is often infeasible or impractical to produce. For example, customers using applications often test with production data (live data), without a fallback in case the test fails. This can result in complex cancellation processes.

Implementations of the present disclosure provide different views (proxy views) on the content of a table using respective access schemas. In some examples, a first view is provided for the production user, who only has access to (sees) production data (live data). In some examples, a second view is provided for the test user, who has access to (sees) the production data as well as changes in data that result from the test. The test data can be deleted after the test is completed. In accordance with implementations of the present disclosure, this is achieved by providing a second table, which contains the delta, and by providing the test user access using an access view that joins the production data and the test data. In the case where the test user would like to write test data, an instead-of-trigger, described herein, is provided.

Figure 3D:
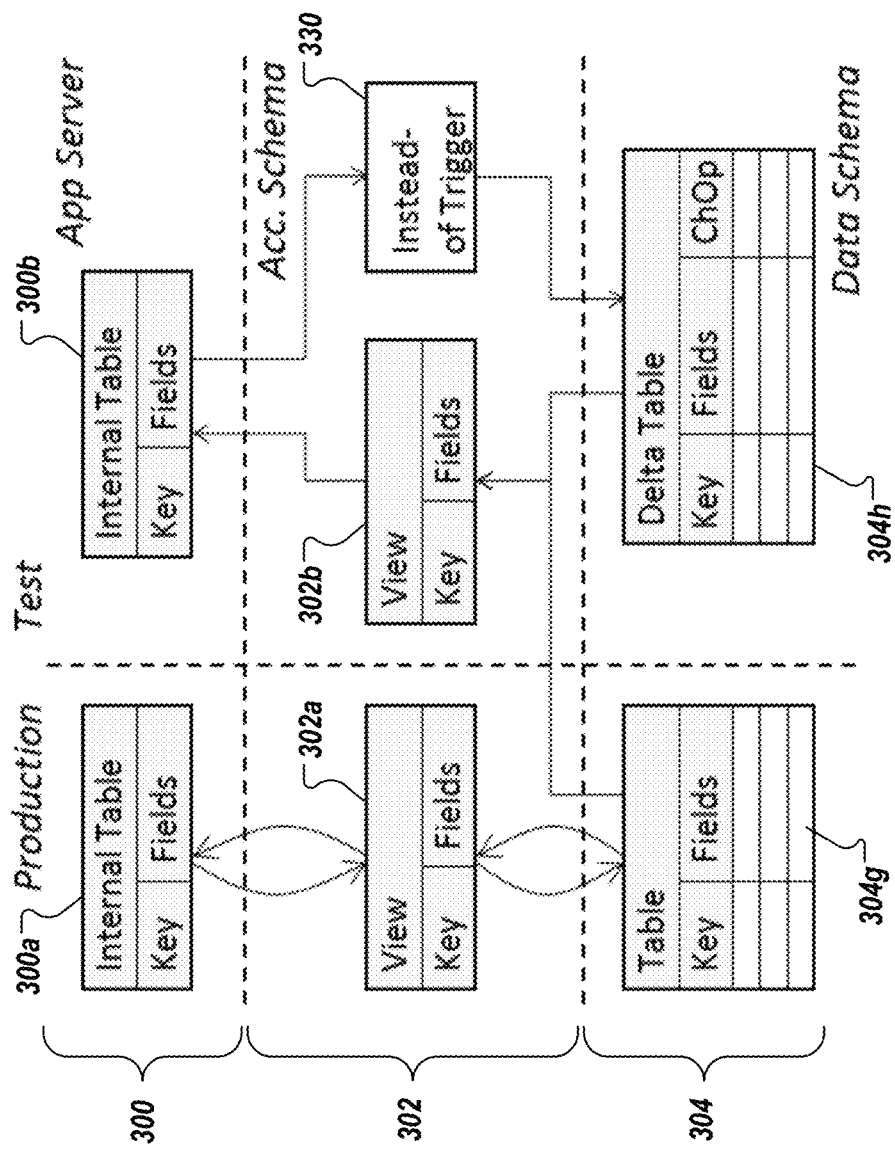

FIG. 3D depicts example tables and table interactions for testing in accordance with implementations of the present disclosure. The example of FIG. 3D includes the application server layer 300, the access schema layer (abstraction layer) 302, and the data schema layer 304. The application server layer includes the internal tables 300a, 300b of respective applications, e.g., a production application (start release) and a test application (target release). The access schema layer 302 includes the proxy views 302a, 302b of respective access schemas, e.g., a production access schema, a test access schema. The data schema layer 304 includes a production content table 304g that includes production data, and a delta content table 304h that includes content deltas resulting from the test. The production application only accesses the data schema layer 304 through the production access schema including the proxy view 302a, and the test application only accesses the data schema layer 304 through the respective access schema including the proxy view 302b. The proxy view 302b joins data from the production content table 304g and the delta content table 304h. The access schema layer 302 also includes an instead-of trigger 330, which is used to write data to the delta table 304h during the test.

Implementations of the present disclosure further provide a "select for update" function. More particularly, when complex views, e.g., join views, are used for read access, a write attempt to the same view is passed to an instead-of trigger, as described herein. In some examples, this disables the database feature of a "select for update," and the database would have to propagate the lock from the view to the required database tables. In some instances, this is only possible for updateable views. In some examples, where a stored procedure is used, the update logic, and thus the locking logic, is provided in the instead-of trigger. In accordance with implementations of the present disclosure, the database interface is provided with the metadata of the join, and derives which underlying data records are to be locked based on the metadata.

Implementations of the present disclosure further provide persisted locks. More particularly, during the transition of the start release, e.g., V1, to the target release, e.g., V2, it is to be ensured that data read or written by the target release is not altered by the start release afterwards. For example, for after-import-methods, the computed database content can depend on the data read. Consequently, it should be ensured that the data is not altered after it has been read. Accordingly, implementations of the present disclosure provide persistent locks, which can be set on the target release and are kept on the start release until all users have transitioned from the start release and are running the target release. The locks are requested on the target release and are executed on the start release and are kept until the start release is no longer in use.

Figure 4:
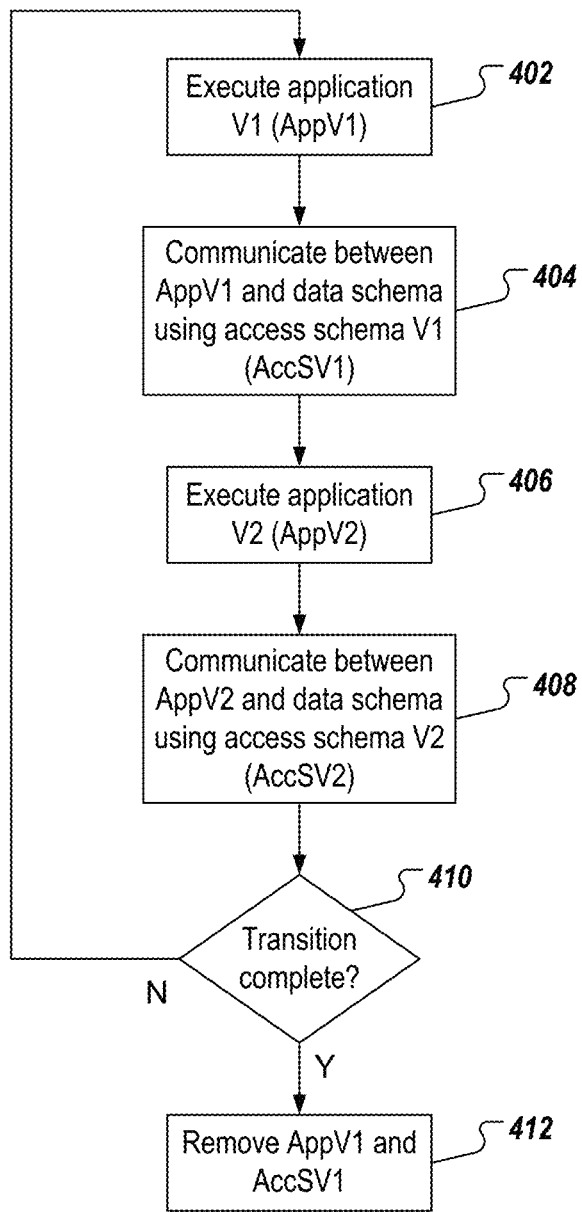
FIG. 4 is a schematic illustration of example computer systems that can be used to execute implementations of the present disclosure.

FIG. 4 depicts an example process 400 that can be executed in accordance with implementations of the present disclosure. In some examples, the example process 400 can be provided by one or more computer-executable programs executed using one or more computing devices.

A first application is executed (402). For example, the first application (AppV1) can be executed by one or more server devices 108 of FIG. 1. In some examples, a user can interact with the first application using a client device, such as the client device 102 of FIG. 1. For example, a user interface (UI) can be displayed to the user on the client device, through which the user can interact with the first application executing on the server device. Communication is facilitated between first application and a data schema using a first access schema (AccSV1) (402). For example, the first access schema facilitates communication between the first application and, for example, a customer table of the data schema, as described herein.

A second application is executed (406). For example, the second application (AppV2) can be executed by one or more server devices 108 of FIG. 1. In some examples, a user can interact with the second application using a client device, such as the client device 102 of FIG. 1. For example, a user interface (UI) can be displayed to the user on the client device, through which the user can interact with the second application executing on the server device. In some examples, the second application is executed as part of a maintenance procedure, e.g., upgrade, patch. Communication is facilitated between the second application and the data schema using a second access schema (AccSV2) (408). For example, the second access schema facilitates communication between the second application and, for example, a customer table of the data schema, as described herein. In some examples, the second access schema facilitates communication between the second application and, for example, an application table of the data schema, as described herein, e.g., during testing of the second application.

It is determined whether a transition is complete (410). For example, the transition can be complete after the second application has been successfully tested, while the first application continues to be executed in production. If the transition is not complete, the example process 400 loops back. If the transition is complete, the first application and the first access schema can be removed, e.g., deleted from one or more server devices.

As described herein, and generally outlined with reference to FIG. 4, a new version of software, e.g., V2, can be deployed, while the old version of the software, e.g., V1, is still accessible to users. In some examples, an instance started with the new version of the software can access data, e.g., production' business data. In some examples, this enables a test environment to be provided for particular users, e.g., development/test engineers, administrators, in which test data can be used to test the new version of the software. In some examples, after the test, the user can consistently delete the test data, and it can be determined whether the new version of the software performed as expected, and whether the upgrade should switch the production, e.g., which version is available to customers, from start version, e.g., V1, to the target version, e.g., V2. In some examples, if the test reveals problems with the new version, additional corrections can be deployed and/or the new version can be removed.

Figure 5:
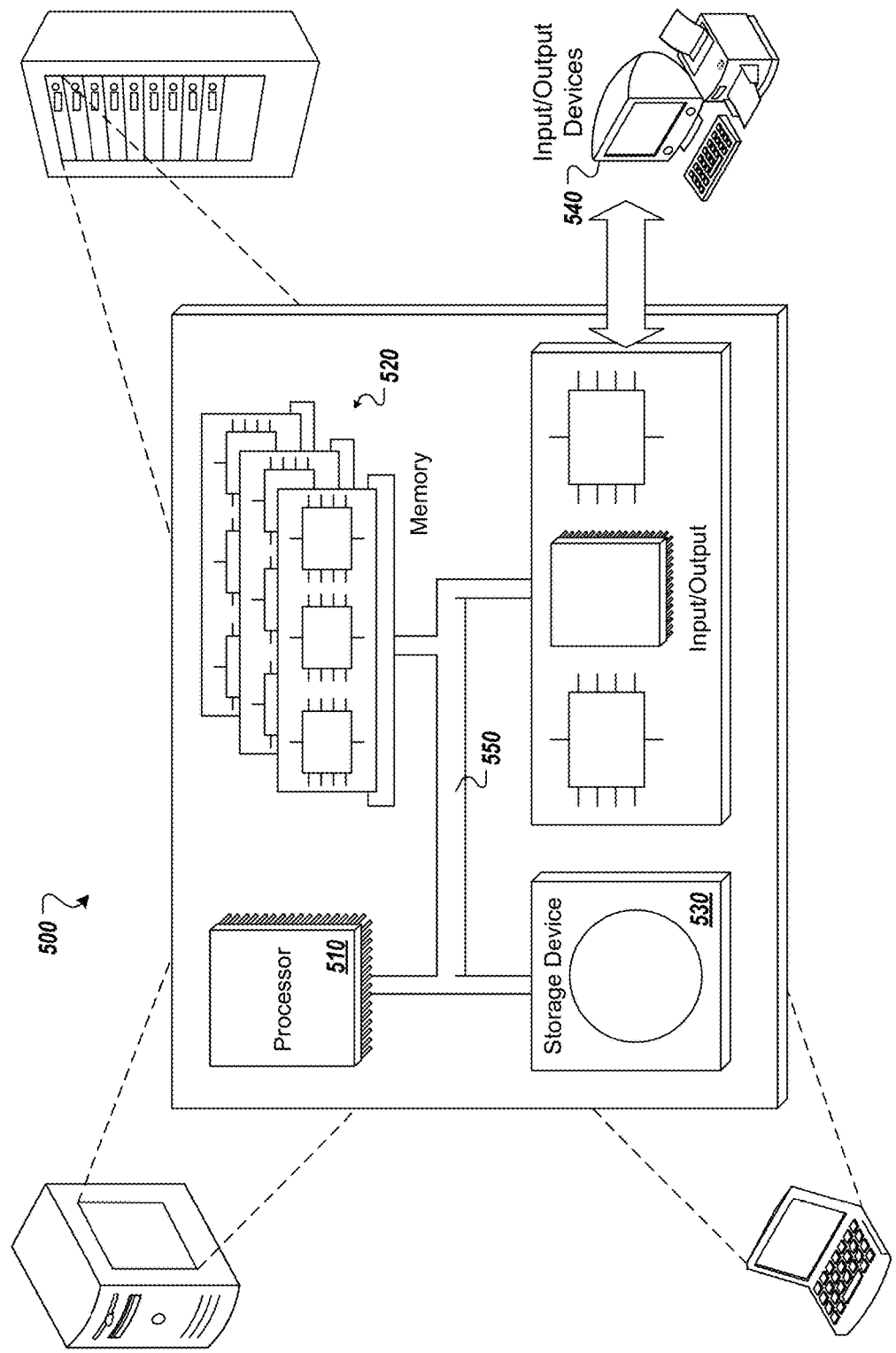
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit. The storage device 530 is capable of providing mass storage for the system 500. In one implementation, the storage device 530 is a computer-readable medium. In various different implementations, the storage device 530 may be a floppy disk device, a hard disk device, an optical disk device, or a tape device. The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for minimizing downtime during maintenance procedures to an application, the method being executed using one or more processors and comprising:

executing, by the one or more processors, a first application that is a first version of the application;

executing, by the one or more processors, a second application that is a second version of the application;

providing, by the one or more processors, an access schema layer that facilitates communication between applications and a data schema layer, the data schema layer comprising one or more tables of a database, wherein, during a maintenance procedure comprising a function defined by a metadata, the access schema layer comprises:

a first access schema, the first access schema facilitating exclusive communication between the first application and at least one table of the database, and a second access schema, the second access schema facilitating exclusive communication between the second application and the one or more tables of the database;

providing, by the one or more processors, at least one lock derived based on the metadata that prevents the first application from accessing a data object in the database that the second application has exclusive access to during the maintenance procedure; and providing, by the one or more processors, an abstraction layer between the access schema layer and the data schema layer, wherein during the maintenance procedure, the abstraction layer provides a version key field for a content of each of the one or more tables of the database such that first data associated to the first version of the application is separately available from second data associated to the second version of the application.

2. The method of claim 1, wherein the first access schema comprises one or more views, each view comprising a projection view to the at least one table that defines one or more fields of the at least one table, from which data is to be selected in response to a query from the first application.

3. The method of claim 1, wherein the second access schema comprises at least one view that joins data retrieved from multiple tables, and provides the data to the second application.

4. The method of claim 3, wherein the multiple tables comprise the at least one table and a delta table, the delta table storing test data that is provided during execution of the first application as a production application and the second application as a test application.

5. The method of claim 3, wherein the access schema layer further comprises a trigger that, in response to a write request from the second application, writes data to a table of the multiple tables.

6. The method of claim 3, wherein the multiple tables comprise a customer table that stores customer data, and an application table that stores application data that is specific to the second application.

7. The method of claim 1, wherein the second application is a new version of the first application, and the maintenance procedure comprises an upgrade procedure.

8. The method of claim 1, further comprising copying, by a database trigger, data from a first table to a second table, wherein, during the maintenance procedure, the first access schema accesses the first table and the second access schema accesses the second table.

9. A non-transitory computer-readable storage medium coupled to one or more processors and having instructions stored thereon which, when executed by the one or more processors, cause the one or more processors to perform operations for minimizing downtime during maintenance procedures to an application, the operations comprising:

executing a first application that is a first version of the application;

executing a second application that is a second version of the application;

providing an access schema layer that facilitates communication between applications and a data schema layer, the data schema layer comprising one or more tables of a database, wherein, during a maintenance procedure comprising a function defined by a metadata, the access schema layer comprises:

a first access schema, the first access schema facilitating exclusive communication between the first application and at least one table of the database, and a second access schema, the second access schema facilitating exclusive communication between the second application and the one or more tables of the database;

providing at least one lock derived based on the metadata that prevents the first application from accessing a data object in the database that the second application has exclusive access to during the maintenance procedure; and providing an abstraction layer between the access schema layer and the data schema layer, wherein during the maintenance procedure, the abstraction layer provides a version key field for a content of each of the one or more tables of the database such that first data associated to the first version of the application is separately available from second data associated to the second version of the application.

10. The computer-readable storage medium of claim 9, wherein the first access schema comprises one or more views, each view comprising a projection view to the at least one table that defines one or more fields of the at least one table, from which data is to be selected in response to a query from the first application.

11. The computer-readable storage medium of claim 9, wherein the second access schema comprises at least one view that joins data retrieved from multiple tables, and provides the data to the second application.

12. The computer-readable storage medium of claim 11, wherein the multiple tables comprise the at least one table and a delta table, the delta table storing test data that is provided during execution of the first application as a production application and the second application as a test application.

13. The computer-readable storage medium of claim 11, wherein the access schema layer further comprises a trigger that, in response to a write request from the second application, writes data to a table of the multiple tables.

14. The computer-readable storage medium of claim 11, wherein the multiple tables comprise a customer table that stores customer data, and an application table that stores application data that is specific to the second application.

15. A system, comprising:
a computing device; and
a computer-readable storage device coupled to the computing device and having instructions stored thereon which, when executed by the computing device, cause the computing device to perform operations for minimizing downtime during maintenance procedures to an application, the operations comprising:

executing a first application that is a first version of the application;

executing a second application that is a second version of the application;

providing an access schema layer that facilitates communication between applications and a data schema layer, the data schema layer comprising one or more tables of a database, wherein, during a maintenance procedure comprising a function defined by a metadata, the access schema layer comprises:

a first access schema, the first access schema facilitating exclusive communication between the first application and at least one table of the database, and a second access schema, the second access schema facilitating exclusive communication between the second application and the one or more tables of the database;

providing at least one lock derived based on the metadata that prevents the first application from accessing a data object in the database that the second application has exclusive access to during the maintenance procedure; and providing an abstraction layer between the access schema layer and the data schema layer, wherein during the maintenance procedure, the abstraction layer provides a version key field for a content of each of the one or more tables of the database such that first data associated to the first version of the application is separately available from second data associated to the second version of the application.

16. The system of claim 15, wherein the first access schema comprises one or more views, each view comprising a projection view to the at least one table that defines one or more fields of the at least one table, from which data is to be selected in response to a query from the first application.

17. The system of claim 15, wherein the second access schema comprises at least one view that joins data retrieved from multiple tables, and provides the data to the second application.

18. The system of claim 17, wherein the multiple tables comprise the at least one table and a delta table, the delta table storing test data that is provided during execution of the first application as a production application and the second application as a test application.

19. The system of claim 17, wherein the access schema layer further comprises a trigger that, in response to a write request from the second application, writes data to a table of the multiple tables.

20. The system of claim 17, wherein the multiple tables comprise a customer table that stores customer data, and an application table that stores application data that is specific to the second application.

* * * * *